United States Patent [19]
Poplingher

[11] Patent Number: 6,021,489
[45] Date of Patent: *Feb. 1, 2000

[54] APPARATUS AND METHOD FOR SHARING A BRANCH PREDICTION UNIT IN A MICROPROCESSOR IMPLEMENTING A TWO INSTRUCTION SET ARCHITECTURE

[75] Inventor: Mircea Poplingher, Campbell, Calif.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/885,394

[22] Filed: Jun. 30, 1997

[51] Int. Cl.$^7$ ...................................................... G06F 9/38
[52] U.S. Cl. ............................ 712/239; 712/235; 712/23
[58] Field of Search .................................... 395/586, 582, 395/800.23; 712/239, 235, 23

[56] References Cited

U.S. PATENT DOCUMENTS

| | | | |
|---|---|---|---|
| 5,586,278 | 12/1996 | Papworth et al. | 395/582 |
| 5,606,676 | 2/1997 | Grochowski et al. | 395/586 |
| 5,655,098 | 8/1997 | Witt et al. | 395/386 |
| 5,742,805 | 4/1998 | Kulkarni et al. | 395/586 |
| 5,794,028 | 8/1998 | Tran | 395/587 |
| 5,822,574 | 10/1998 | Tran | 395/580 |

*Primary Examiner*—Krisna Lim
*Attorney, Agent, or Firm*—Blakely, Sokoloff, Taylor & Zafman LLP

[57] ABSTRACT

A microprocessor that includes first and second Instruction Fetch Units (IFU) coupled therebetween is provided. The first IFU implements a first Instruction Set Architecture (ISA). The second IFU implements a second ISA. The microprocessor further includes a shared branch prediction unit coupled to the first and second IFU. The shared branch prediction unit stores prediction-related information. In the same paragraph, the present invention also provides a method of performing branch prediction. According to this method, an instruction pointer is provided to a branch prediction unit that stores information shared by first and second IFU. The instruction pointer is generated by one of the first and second IFU that is active. Determination is made of whether an instruction corresponding to the instruction pointer, provided to the branch prediction unit, is a branch instruction, and if so, it is determined if a branch is predicted taken. If the branch instruction is predicted taken, target address corresponding to the branch instruction is provided to the first and second IFU.

15 Claims, 3 Drawing Sheets

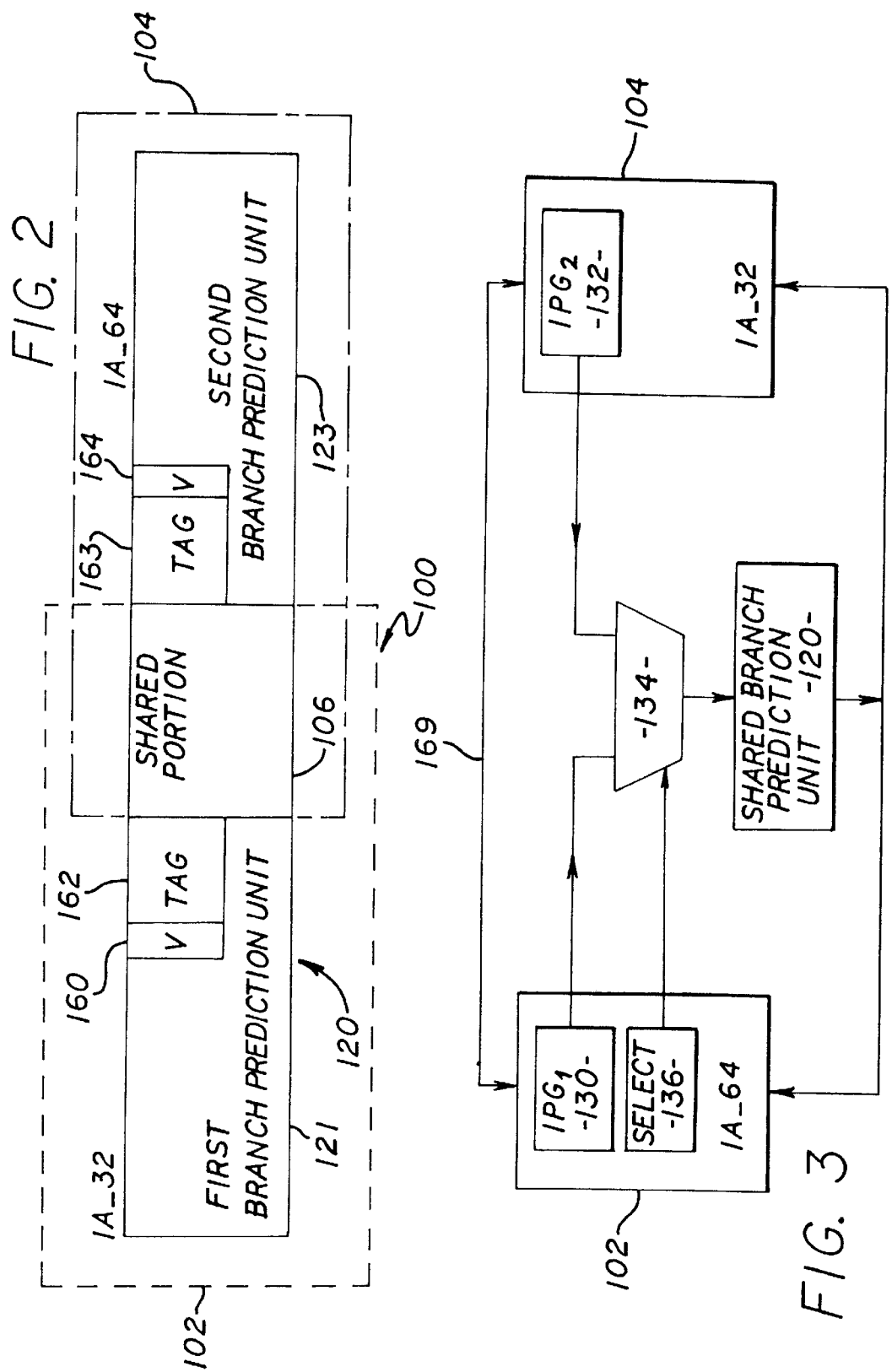

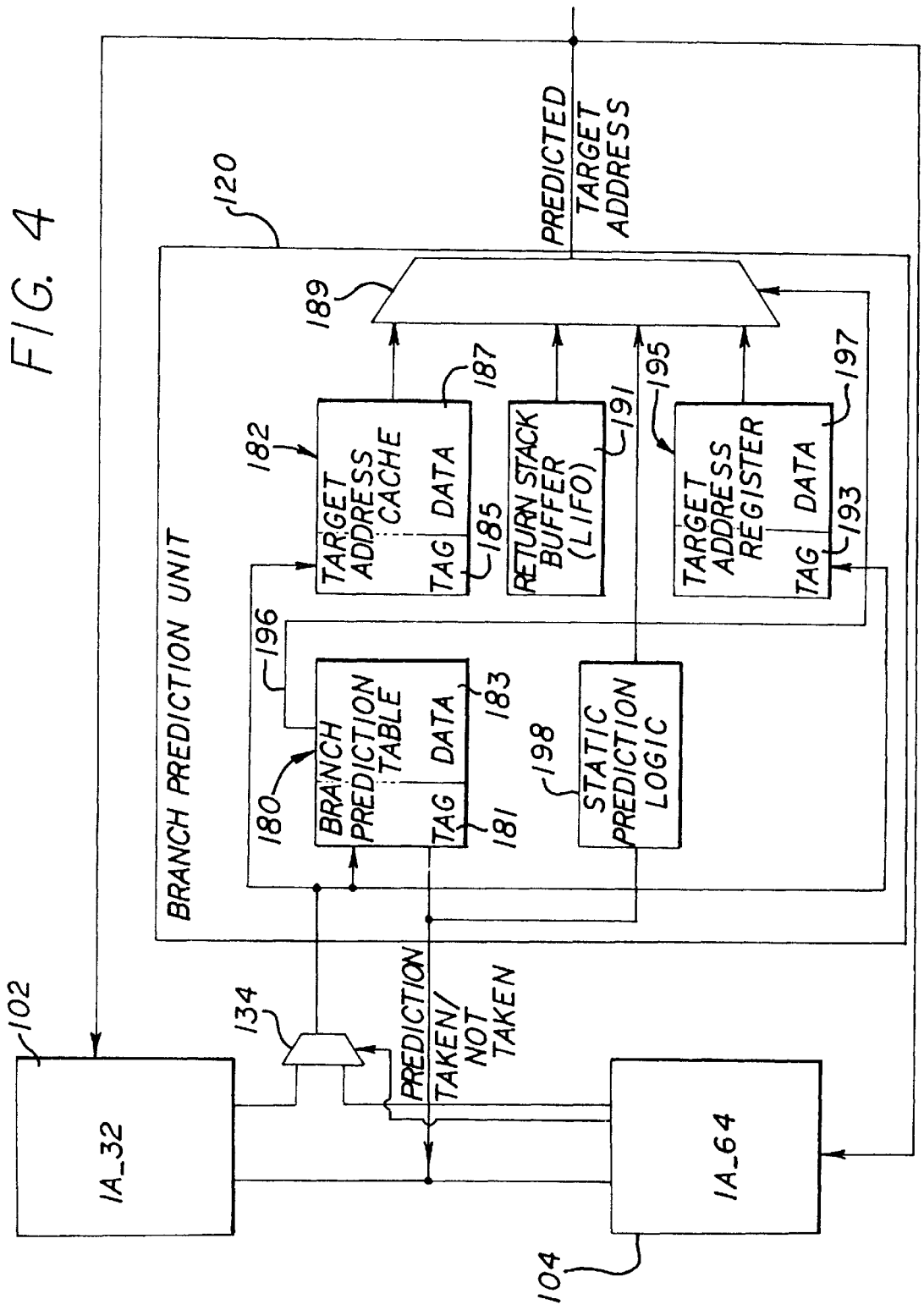

APPARATUS AND METHOD FOR SHARING A BRANCH PREDICTION UNIT IN A MICROPROCESSOR IMPLEMENTING A TWO INSTRUCTION SET ARCHITECTURE

BACKGROUND OF THE INVENTION (1) Field of the Invention

The present invention relates to microprocessors. More specifically, the present invention relates to branch prediction in microprocessors.

(2) Background Information

Silicon process technology has lead to the development of increasingly larger die sizes for integrated circuits which are capable of including millions of transistors on a single die. Also advances in microprocessor computer architectures have provided architectures that use a larger number of bits than conventional computer architectures. In the following description, the word "architecture" refers to Instruction Set Architecture (ISA). For example, Intel microprocessors may be implemented with 32 bits, i.e., Intel Architecture 32 (IA-32) as well as with 64 bits, i.e., Intel Architecture 64 (IA-64). The IA-64 architecture provides full backward compatibility for executing existing code written for the IA-32 architecture. The execution of existing IA-32 code by a microprocessor that implements an IA-64 architecture may be accomplished in various ways, from software emulation to a full hardware implementation of an IA-32 machine on a chip that implements the IA-64 architecture, such that the IA-32 and the IA-64 may co-exist on the same clip. One advantage of having two architectures on the same chip is increased performance of both architectures while maintaining backward binary compatibility.

To utilize a microprocessor in a computer system, an operating system compatible with the microprocessor's architecture is developed. In addition to providing a compatible operating system, application programs compatible with the microprocessor's architecture are developed. For example, a large number of application programs compatible with Intel architectures are commercially available.

Assume that a user starts utilizing a more advanced microprocessor architecture. The user has a large customer base that had previously purchased software (application programs) compatible with the previous architecture. It is advantageous to integrate both IA-64 and IA-32 architectures on the same chip to allow customers endowed with old software to utilize a new processor (that integrates IA-32 and IA-64), select the IA-32 architecture when executing existing software and switch to the IA-64 architecture when utilizing new software. Integrating two microprocessor architectures on a same chip, however, needs to employ a relatively large area on the chip. It is desirable to integrate two microprocessor architectures on a same chip without having to utilize a relatively large area on the chip.

SUMMARY OF THE INVENTION

The present invention provides a microprocessor that includes first and second Instruction Fetch Units (IFU) coupled therebetween. The first Instruction Fetch Unit implements a first Instruction Set Architecture (ISA). The second IFU implements a second ISA. The microprocessor also includes a shared branch prediction unit coupled to the first and second IFU. The shared branch prediction unit stores prediction-related information.

BRIEF DESCRIPTION OF THE DRAWINGS

The features, aspects, and advantages of the present invention will become more fully apparent from the following Detailed Description, appended claims, and accompanying drawings in which:

FIG. 2 illustrates a more detailed block diagram of a microprocessor with a branch prediction unit according to one embodiment of the present invention;

FIG. 3 is a block diagram illustrating the intercoupling between first and second data processing engines of the microprocessor according to one embodiment of the present invention; and FIG. 4 illustrates a block diagram of a microprocessor with first and second microprocessor engines sharing a branch prediction unit.

DETAILED DESCRIPTION OF THE INVENTION

Figure 1:
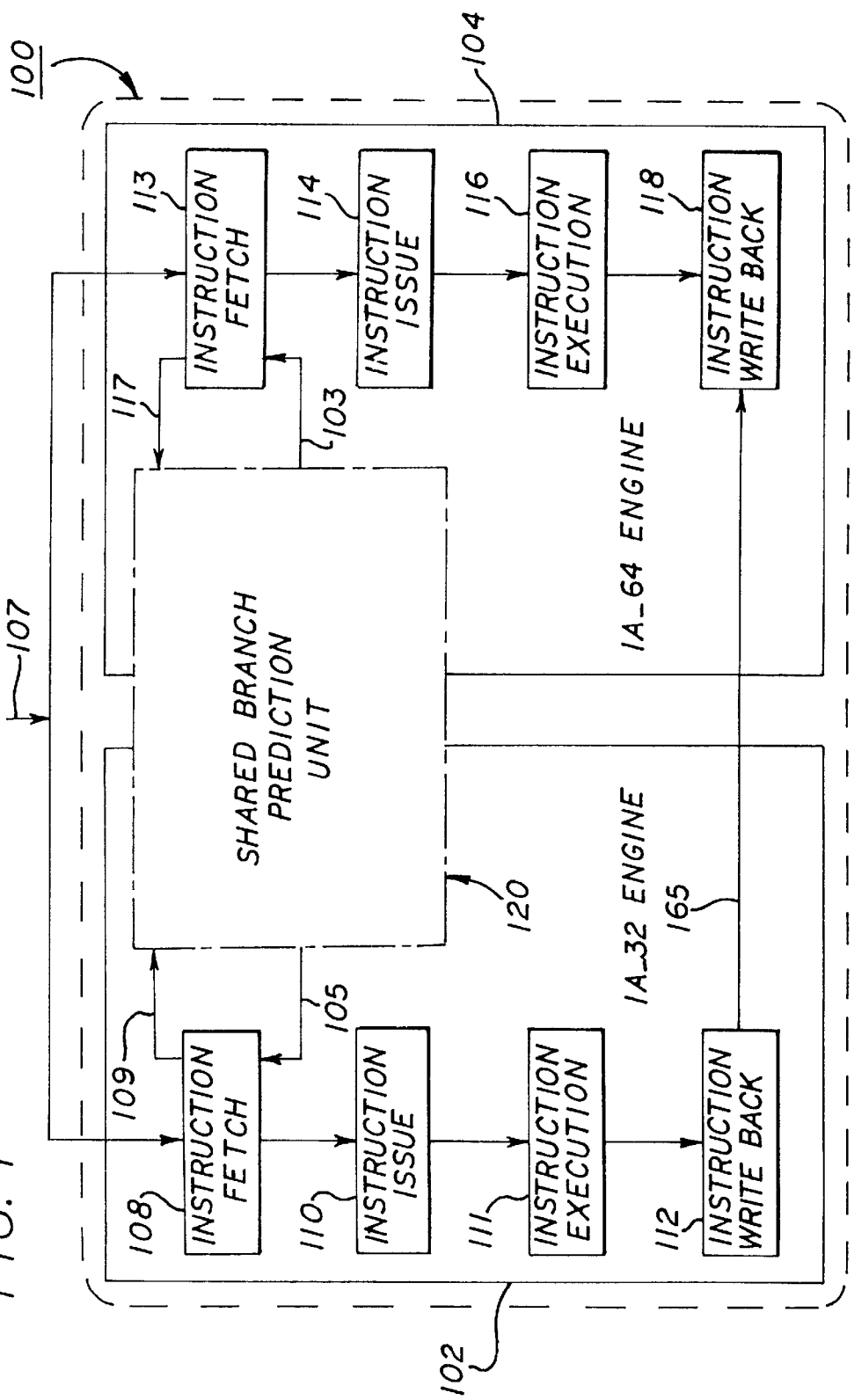
FIG. 1 illustrates a block diagram (shown in dotted line) of a microprocessor according to one embodiment of the present invention.

In the following description, numerous specific details are set forth to provide a thorough understanding of the present invention. However, one having ordinary skill in the art should recognize that the invention may be practiced without these specific details. In some instances, well-known circuits, structures, and techniques have not been shown in detail to avoid obscuring the present invention.

FIG. 1 illustrates, in a simplified block diagram form an embodiment of, an integrated circuit (microprocessor 100) including a first data processing (DP) engine 102 and a second DP engine 104 in accordance with the present invention. The first DP engine 102 implements a first instruction set architecture (ISA) (hereinafter referred to as "first architecture"). In one embodiment of the present invention described herein, the first architecture includes an Intel Architecture-32 (IA-32), but the present invention is not limited in scope to an IA-32 architecture. The second DP engine 104 implements a second ISA (hereinafter referred to as "second architecture). In the embodiment of the present invention described herein, the second architecture includes an Intel Architecture-64 (IA-64), but the present invention is not limited in scope to an IA-64 architecture. The IA-32 architecture utilizes 32 bits while the IA-64 architecture utilizes 64 bits. Microprocessor 100 may implement any other two different microprocessor's architectures.

Microprocessor 100 is coupled to a front side bus 107 through which instruction and data from a system memory flow. Instructions that flow through front side bus 107 are driven to Instruction Fetch Units 108 and 113 that belong to first and second DP engines 102 and 104 respectively. Instruction fetch unit 108 typically includes an instruction cache that stores instructions to be executed. Instructions are issued by instruction issue unit 110 and driven to an instruction execution unit 111 which executes the instructions and drives the result of the execution to an instruction write back unit 112. Second DP engine 104 includes substantially similar units, as first DP engine 102, such as instruction fetch unit 113, instruction issue unit 114, instruction execution unit 116, and instruction write back unit 118. The engine 104 of the IA-64 architecture maintains architecturally visible (physical registers) where information is stored by the instruction write back units 118 and 112. Instruction write back unit 112 drives information via line 165 to instruction write back unit 118. These units, of second DP engine 104, operate in a similar way as the above-described units of first DP engine 102.

Microprocessor 100 also includes shared branch prediction unit 120 (shown in dotted line). Branch prediction unit 120 is shared by both first and second microprocessors engines 102 and 104. In one embodiment according to the present invention, branch prediction unit 120 includes two branch prediction units (not shown) each operating in connection with one of the IA-32 and IA-64 architectures respectively. The first and second branch prediction units share common prediction-related signal information (hereinafter referred to as "prediction information) stored in branch prediction unit 120. Branch prediction unit 120 typically receives an instruction from one of the Instruction Fetch Units 108 and 113 via one of lines 109 and 117 respectively and determines, based on prediction information stored in the branch prediction unit 120, whether a branch is taken or not. Branch prediction unit 120 then drives a control signal TAKEN/NOT TAKEN and a predicted target address to Instruction Fetch Units 108 and 113 via lines 105 and 103 respectively. If a branch is predicted taken, one of Instruction Fetch Units 108 and 113 (whichever is active) issues a target instruction (i.e. the instruction stored at the address where the branch is predicted taken) or if a branch is predicted not taken, a sequentially next instruction, from a sequenced flow of instructions, is issued. Note that branch prediction unit 120 may be endowed with a target address cache (TAC) (not shown) which stores target addresses. In this case, in the event a branch is predicted taken, a target address is driven by the TAC to instruction fetch units 108 and 113.

FIG. 2 illustrates a more detailed block diagram of microprocessor 100 according to one embodiment of the present invention. Microprocessor 100 includes first and second DP engines 102 and 104 that share branch prediction unit 120. Branch prediction unit 120 includes a first branch prediction unit 121 and a second branch prediction unit 123 that are used for branch prediction by first and second DP engines 102 and 104 respectively. Branch prediction units and branch prediction are well-known in the art. First and second branch prediction units 121 and 123 include a common (shared) portion 106 of branch prediction unit 120. Portion 106 stores prediction information shared by first and second DP engines 102 and 104 respectively. More specifically, portion 106 stores information shared by first and second branch prediction units 121 and 123 respectively, although one skilled in the art may utilize portion 106 for storing information to be shared by other units of first and second DP engines One example a shared portion 106 branch prediction unit 120 is a branch prediction table. Branch prediction tables and their operation are known in the art. Portion 106 may also include logic that processes prediction information. The prediction information may include history information, speculative history information, pattern history table, computational data, etc., all known in the art. A branch prediction unit 120 may include a branch target buffer (BTB), a branch prediction table (BPT) coupled to a target address cache (TAC), a return stack buffer (RSB), etc., all known in the art.

In one embodiment of the present invention, portion 106 stores information that otherwise would be stored in two separate branch prediction tables of first and second DP engines 102 and 104. It has been found that information stored in a branch prediction table is substantially similar for first and second DP engines 102 and 104 implementing IA-64 and IA-32 architectures. Microprocessor 100 according to the present invention may share either the entire branch prediction table or certain prediction data in connection with the branch prediction table such as history information, speculative history information, pattern history table/s, computational data, etc. In the embodiment of the microprocessor according to the present invention, shown in FIG. 2, portion 106 shares prediction data including history information, speculative history information, pattern history table/s, etc. Branch prediction units 121 and 123 separately store tags (in storage areas 162 and 163 respectively) for branch instructions and a VALID bit (in storage areas 160 and 164 respectively) associated with each branch instruction corresponding to the tag. The tag portion typically is compared with an instruction pointer generated by an instruction pointer generator. If the tag matches the instruction pointer, the shared portion 106 is accessed to determine branch history, speculative branch history, type of branch, pattern history table/s, etc., and based thereon to predict whether a branch is taken or not.

In one embodiment according to the present invention, portion 106 is implemented as a four-way associative cache and may hold history for 1024 branches. Table 1 illustrates, by way of example, bit allocations for several prediction data included in a branch prediction table and in a target address cache in connection with an embodiment of a microprocessor, according to the present invention, that integrates IA-64 and IA-32 DP engines. While the size of an address for an IA-64 architecture is 64 bits, it has been found that the 64-bit architecture may only need to predict 40 bits, as jumps to addresses spaced apart within more than 40 bits are rare. Accordingly, the branch prediction unit 123 of the IA-64 architecture makes prediction with respect to 40 least significant bits of an address of a current instruction and concatenates the current most significant 24 bits of the address of the current instruction.

|  | No. of bits |
|---|---|
| BRANCH PREDICTION TABLE FIELDS BPT field |  |
| Tag | 15–42 |
| Valid | 1 |
| History | 5 |
| Spec History | 5 |
| Branch Type | 3 |
| Pattern History Table (PHT) | 32 |
| Least Recently Used (LRU) | 3 |
| TARGET ADDRESS CACHE FIELDS TAC field |  |
| Tag | 18 |
| Valid | 1 |
| Target Address | 40 |
| Predict vector | 2 |
| Last recently used (LRU) | 3 |

By having one portion 106 instead of two such portions microprocessor 100, according to the present invention utilizes reduced silicon area. Moreover, if the combined total amount of silicon that is needed for two different branch prediction units is utilized, one may implement a larger shared portion 106 of branch prediction unit 120 that confers performance benefits to microprocessor 100.

FIG. 3 is a block diagram illustrating interconnections between first DP engine 102 and second DP engine 104. DP engines 102 and 104 are both coupled to shared branch prediction unit 120. The first DP engine includes an instruction pointer generator (IPG) 130 that generates an instruction pointer to shared branch prediction unit 120 in connection with an instruction to be executed by an instruction execution unit of the first DP engine 102. Similarly, second DP engine 104 includes an instruction pointer generator (IPG) 132 that generates an instruction pointer to shared branch prediction unit 120 in connection with an instruction to be executed by an instruction execution unit of second DP engine 104. The instruction pointers from IPG 130 and 132 are driven to first and second inputs of an instruction pointer selecting device 134 (multiplexer 134). First DP engine 102 includes a select circuit 136 configured to generate a control signal coupled to instruction pointer multiplexer 134. The control signal indicates to multiplexer 134 which of the two DP engines 102 and 104 is active.

Typically, when one DP engine is active, the other DP engine is inactive. Activity or inactivity of a DP engine may be controlled by a particular instruction in the instruction stream that, when executed by one of the DP engines, causes the respective engine to become inactive and relinquish control to the other engine. One way of implementing this mechanism is by having the previously active engine send an instruction pointer indicating to the inactive engine where to start fetching instructions to be executed. Also, the previously active engine issues a control signal, via line 169, to the inactive engine, in response to which the inactive engine becomes active thereby starting fetching and executing of instructions. Depending on the control signal fed to multiplexer 134 by select circuit 136, multiplexer 134 drives the instruction pointer generated by the instruction pointer generator of the currently active DP engine to the shared branch prediction unit 120. The instruction pointer is compared with the respective tag of one of the first and second branch prediction units (that belongs to the active DP engine), and if there is a match, prediction data stored in shared branch prediction unit 120, is examined to determine if a branch is predicted taken or not taken. If a branch is predicted taken, shared branch prediction unit 120 drives a target instruction to DP engines 102 and 104.

FIG. 4 illustrates a block diagram with first 102 and second 104 DP engines sharing entire branch prediction unit 120. In the embodiment of the present invention illustrated in FIG. 4, in addition to the prediction information stored in branch prediction table (BPT) 180, DP engines 102 and 104 share information included in several structures of the branch prediction unit 120. Branch Prediction Table has a tag portion 181 and data storage portion 183. The data storage may include History, Speculative History, Pattern, History Table/s, etc. Note that in the embodiment illustrated in this figure both the tag and the data (prediction information) are shared by the two DP engines. Also, branch prediction unit 120 includes a target address cache (TAC) 182 with a tag storage area 185 and data storage area 187. The TAC data storage area 187 includes target addresses for which tags corresponding thereto are stored in the tag storage area 185. An instruction pointer generator of one of DP engines 102 and 104 typically issues an instruction pointer to BPT 180 and to TAC 182 via multiplexer 134. BPT 180 predicts whether a branch is predicted taken or not taken, based on branch history, branch speculative history, pattern history table/s, etc. TAC 182 determines whether it stores a target address corresponding to the instruction pointer. If a branch is predicted taken and the TAC 182 stores a target address corresponding to the instruction pointer, TAC 182 drives that target address to a multiplexer 189, which is configured to drive one of the addresses input thereto to its output. Branch prediction unit 120 further includes a return stack buffer (RSB) 191. A return stack buffer is a small stack that stores targets for return instructions. Upon a procedure call, a target address for a return instruction is pushed onto the return stack buffer RSB according to a last-in-first-out (LIFO) mechanism. BPT 180 includes a field storing information that indicates the type of a branch instruction. The information indicating the type of branch is driven to a control input of multiplexer 189 via line 196. In response to this information, multiplexer 189 selects the target of the return instruction from the return stack buffer 191, if a predicted branch instruction is of a "return" type.

Branch prediction unit 120 also includes a target address register 195 with a tag storage portion 193 and a data storage portion 197. The target address register 193 has four entries that store targets allocated for software scheduled loop branches and most likely taken branches as determined by a compiler. The target address register 193 is also coupled to multiplexer 189. Multiplexer 189 selects at its output a respective target address, according to the control signal generated by BPT 180 via line 196. Additionally, branch prediction unit 120 includes a static prediction logic 198 that may be shared by the two microprocessors engines 102 and 104. Static prediction logic 198 and the mechanism utilizing it are known in the art. Typically, the static prediction logic 198 is utilized if a dynamic prediction mechanism (implemented by BPT 180) misses a prediction. The static prediction logic 198 takes an instruction and decodes the information included in the instruction to determine whether the instruction is a branch instruction. If the instruction is a branch instruction, the static prediction logic 198 decodes an offset of the branch instruction and adds the decoded offset to the current instruction pointer to determine the target address.

In the foregoing specification, the invention has been described with reference to specific embodiments thereof. It will however be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

I claim:

1. A microprocessor comprising:
    a first Instruction Fetch Unit (IFU) that implements a first instruction set architecture (ISA);
    a second IFU, coupled to said first IFU, that implements a second ISA; and
    a shared branch prediction unit coupled to said first and second IFU, the shared branch prediction unit storing prediction-related information.

2. The microprocessor of claim 1 wherein said prediction-related information stored in said branch prediction unit includes prediction data.

3. The microprocessor of claim 2 wherein said prediction-related information further includes tag information corresponding to said prediction data.

4. The microprocessor of claim 1 wherein said branch prediction unit includes a branch prediction table (BPT) to be shared by first and second IFU.

5. The microprocessor of claim 1 wherein said branch prediction unit includes a Target Address Cache (TAC) to store target addresses, said TAC shared by first and second IFU.

6. The microprocessor of claim 1 wherein said branch prediction unit includes a Branch Target Buffer (BTB) to be shared by first and second IFU.

7. The microprocessor of claim 1 wherein said branch prediction unit includes a return stack buffer (RSB) to be shared by first and second IFU.

8. The microprocessor of claim 1 wherein said branch prediction unit includes a target address register (TAR) to be shared by first and second IFU.

9. The microprocessor of claim 1 wherein said branch prediction unit includes computational logic, for static branch prediction, to be shared by first and second IFU.

10. The microprocessor of claim 1 further including a selecting device coupled to said first and second IFU to select one of a first and second instruction pointers, generated by one of said first and second IFU, and to drive the selected instruction pointer to said branch prediction unit.

11. A method of performing branch prediction, the method comprising:
(a) providing an instruction pointer to a branch prediction unit that stores information shared by first and second Instruction Fetch Units (IFU) of a microprocessor, said instruction pointer generated by one of said first and second IFU that is active;
(b) determining whether an instruction corresponding to said instruction pointer, provided to said branch prediction unit, is a branch instruction and if so determining if a branch is predicted taken; and
(c) if said branch instruction is predicted taken providing a target address corresponding to said branch instruction to said first and second IFU.

12. The method of claim 11 wherein (c) includes determining a type of said branch instruction.

13. The method of claim 12 wherein (b) further includes selecting a target address based on said type of said branch instruction.

14. The method of claim 11 wherein (c) further includes determining whether a first storage device, in said branch prediction unit, stores said target address.

15. The method of claim 11 wherein (a) includes selecting one of said first and second instruction pointer to be fed to said branch prediction unit in response to a determination of which of said first and second IFU is active.

* * * * *

UNITED STATES PATENT AND TRADEMARK OFFICE
CERTIFICATE OF CORRECTION

PATENT NO. : 6,021,489
DATED : February 1, 2000
INVENTOR(S) : Poplingher

It is certified that error appears in the above-identified patent and that said Letters Patent is hereby corrected as shown below:

Column 1, line 29, delete "the same clip" and insert -- the same chip --.

Column 2, line 9, delete "the intercoupling" and insert -- the intercouplings --.

Column 2, lines 29 & 30, delete "block diagram form an embodiment of, an integrated circuit" and insert -- block diagram form, an embodiment of an integrated circuit --.

Signed and Sealed this

Thirtieth Day of January, 2001

Attest:

Q. TODD DICKINSON

Attesting Officer

Director of Patents and Trademarks